US011206808B2

(12) United States Patent
Watson et al.

(10) Patent No.: US 11,206,808 B2
(45) Date of Patent: Dec. 28, 2021

(54) REMOVABLE HIDE FOR SMALL ANIMAL HABITAT

(71) Applicant: PetSmart Home Office, Inc., Phoenix, AZ (US)

(72) Inventors: Jeffrey Stocker Watson, Phoenix, AZ (US); Ji Liu, Shanghai (CN); Paul Tamulewicz, Glendale, AZ (US); Peng Qiu, Yancheng (CN)

(73) Assignee: PETSMART HOME OFFICE, INC., Phoenix, AZ (US)

( * ) Notice: Subject to any disclaimer, the term of this patent is extended or adjusted under 35 U.S.C. 154(b) by 147 days.

(21) Appl. No.: 16/567,899

(22) Filed: Sep. 11, 2019

(65) Prior Publication Data

US 2020/0100455 A1    Apr. 2, 2020

Related U.S. Application Data

(60) Provisional application No. 62/739,600, filed on Oct. 1, 2018.

(51) Int. Cl.
*A01K 1/03* (2006.01)
*A01K 1/035* (2006.01)

(52) U.S. Cl.
CPC .............. *A01K 1/03* (2013.01); *A01K 1/035* (2013.01)

(58) Field of Classification Search
CPC ........ F16B 5/0036; F16B 12/44; F16B 12/46; F16B 12/50; F16B 2012/46; A01K 1/33; A01K 1/032; A01K 1/033; A01K 1/03; A01K 1/035; G09G 17/00; G09G 2017/0041; G09G 15/0025; A63H 3/52

USPC .......... 446/112, 115, 476, 110, 104; 119/472
See application file for complete search history.

(56) References Cited

U.S. PATENT DOCUMENTS

| 1,425,166 | A | * | 8/1922 | Bergmann | ............ | A63H 33/084 446/106 |
| 3,020,601 | A | * | 2/1962 | Stambaugh | ............ | A01K 1/033 52/262 |
| 4,803,952 | A | * | 2/1989 | Houser | ................... | A01K 1/033 119/499 |
| 4,946,414 | A | * | 8/1990 | Zimmer | ............... | A63H 33/008 281/15.1 |
| 5,121,710 | A | * | 6/1992 | Gonzalez | ............... | A01K 1/033 119/498 |
| 5,890,338 | A | * | 4/1999 | Rodriguez-Ferre | ......................... A63H 33/008 52/582.1 |
| 7,241,198 | B1 | * | 7/2007 | Boone | ...................... | A63H 3/52 446/110 |
| 2003/0213438 | A1 | * | 11/2003 | Saxe | ...................... | A01K 1/033 119/482 |

(Continued)

FOREIGN PATENT DOCUMENTS

CH       687563 A5    12/1996
CN      2390963 Y     8/2000

(Continued)

*Primary Examiner* — Brady W Frazier
*Assistant Examiner* — Zoe Tam Tran
(74) *Attorney, Agent, or Firm* — Fox Rothschild LLP

(57) ABSTRACT

A hide for a small animal habitat is provided. The hide includes a base, four side panels, a roof and one or more coupling mechanisms for removably coupling the hide to the base. A plurality of coupling mechanisms is contemplated and include tabs having a radially extending flange, an L-shaped in cross section clip, and a rotatable disc.

17 Claims, 11 Drawing Sheets

(56) References Cited

U.S. PATENT DOCUMENTS

| | | | | |
|---|---|---|---|---|
| 2007/0144046 A1* | 6/2007 | Hardt | ........................ | B43L 1/06 40/605 |
| 2013/0036986 A1 | 2/2013 | Callari | | |
| 2014/0144387 A1* | 5/2014 | Chang | .................... | A01K 1/033 119/482 |
| 2015/0237822 A1* | 8/2015 | Jason | ................... | A01K 1/0125 119/480 |

FOREIGN PATENT DOCUMENTS

| | | | | |
|---|---|---|---|---|
| CN | 2501309 Y | 7/2002 | | |
| CN | 201054917 Y | 5/2008 | | |
| CN | 106951036 A | 7/2017 | | |
| CN | 207040489 U | 2/2018 | | |
| CN | 207411146 U | 5/2018 | | |
| EP | 2333353 A2 * | 6/2011 | ............ | F16B 5/0036 |
| GB | 2319456 A | 5/1998 | | |
| KR | 20090074856 A * | 7/2009 | | |
| WO | 2015125069 A1 | 8/2015 | | |

* cited by examiner

See FIG. 3A-1

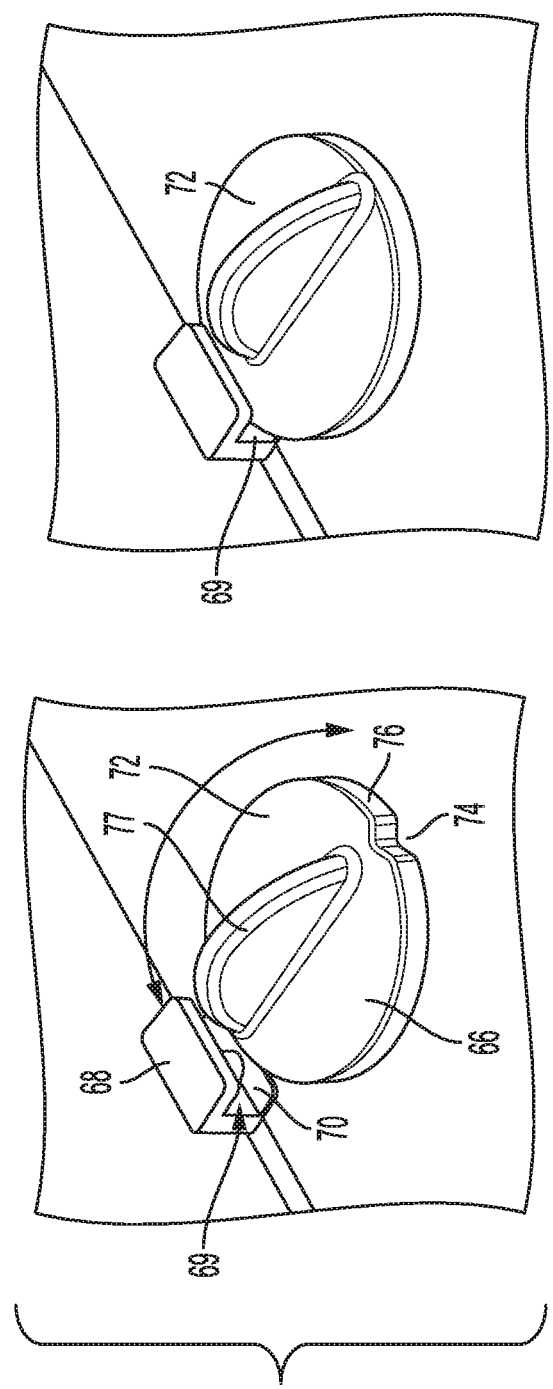

REMOVABLE HIDE FOR SMALL ANIMAL HABITAT

RELATED APPLICATIONS AND CLAIM OF PRIORITY

This patent document claims priority to U.S. Provisional Patent Application No. 62/739,600, filed Oct. 1, 2018, the disclosure of which is fully incorporated into this document by reference.

FIELD OF THE INVENTION

This invention relates to small animal habitats. More particularly, this invention relates to a hide detachably coupled to a small animal habitat.

BACKGROUND OF THE INVENTION

Small animal habitats for housing pets such as, e.g., hamsters, gerbils, mice, rats, etc. are commonly found in many settings, and in an array of sizes and configurations. Generally, these habitats include multiple wall portions, a base portion, and a top portion, with at least one of the wall portions having a wire cage and/or one or more viewing windows to allow for visibility, airflow, etc. into the interior of the habitat. In some configurations, the top portion may form (or include) a lid, thereby allowing the pet owner to access the interior of the habitat for cleaning, feeding, pet removal or replacement, etc. In other configurations, at least one of the top portion and the wall portions may have a door or hatch formed therein so as to allow owner access to the interior of the habitat.

Often, a pet owner may wish to include various accessories within the habitat, such as structures for hiding or sleeping, structures for exercise (e.g., exercise wheels), etc. Some structures, such as the hiding/sleeping structures, may simply be placed within the habit in an unattached manner. Other structures, such as exercise wheels, may be coupled to an interior base or wall portion. However, regardless of if or how the accessories are coupled to habitat, the small animal is still confined within the bounds of the habitat. Additionally, because the accessories are configured for use by the small animal entirely within the bounds of the habitat, the potential for the various accessories to be decorative and/or customizable is limited. Accordingly, the invention described herein discloses devices that are intended to address the issues discussed above and/or other issues.

BRIEF SUMMARY OF THE INVENTION

In one aspect of the invention a small animal habitat with a removable hide is disclosed. The removable hide includes a plurality of habitat side panels that are slidably, detachably coupled to each other by an interlocking mechanism, a base and a roof panel. The base is configured to be positioned over a lower small animal habitat such as a cage and therefore also serves as the lid of the lower small animal habitat. The roof panel includes one or more tabs on a lower edge thereof that snap over the top portion of the side panels. A plurality of coupling mechanisms on the lower edge of one or more side panels are configured to couple the assembled hide to the base. The coupling mechanism may be a plurality of flexible clips that snap into slots on the lid of the lower habitat. In another aspect of the invention, the coupling mechanism may include clips that slide laterally to engage and lock over a raised mating portion on the underside of the lid of the lower habitat. In yet another aspect of the invention, the coupling mechanism may include plurality of locking discs.

BRIEF DESCRIPTION OF THE DRAWINGS

For a better understanding of the invention, and to show how the same may be carried into effect, reference will now be made, by way of example, to the accompanying drawings, in which:

FIG. 2A-1 is a detailed view of a portion of the small animal habitat shown in FIG. 2A.

FIG. 2B-1 is a detailed view of a portion of the small animal habitat shown in FIG. 2B.

FIG. 2B-2 is a detailed view of another portion of the small animal habitat shown in FIG. 2B.

FIG. 3A-1 is a detailed view of a portion of the small animal habitat shown in FIG. 3A.

FIG. 3B-1 is a detailed view of a portion of the coupling mechanism shown in FIG. 3B.

FIG. 4A-1 is a detailed view of a portion of the small animal habitat shown in FIG. 4A.

FIG. 4B-1 is a detailed view of a portion of the coupling mechanism shown in FIG. 4B.

FIG. 5B depicts detail of the coupling mechanism of FIG. 5A.

DETAILED DESCRIPTION OF THE INVENTION

The following description is made for the purpose of illustrating the general principles of the present system and method and is not meant to limit the inventive concepts claimed in this document. Further, particular features described in this document can be used in combination with other described features in each of the various possible combinations and permutations.

Unless otherwise specifically defined in this document, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the"

include plural referents unless otherwise specified. Unless defined otherwise, all technical and scientific terms used herein have the same meanings as commonly understood by one of ordinary skill in the art. All publications mentioned in this document are incorporated by reference. Nothing in this document is to be construed as an admission that the embodiments described in this document are not entitled to antedate such disclosure by virtue of prior invention. As used herein, the term "comprising" means "including, but not limited to". Additionally, use the term "couple", "coupled", or "coupled to" may imply that two or more elements may be directly connected or may be indirectly coupled through one or more intervening elements.

In this document, position-identifying terms such as "vertical", "horizontal", "front", "rear", "side", "top", and "bottom" are not intended to limit the invention to a particular direction or orientation, but instead are only intended to denote relative positions, or positions corresponding to directions shown when a removable hide or related component is oriented as shown in the Figures.

Figure 1:
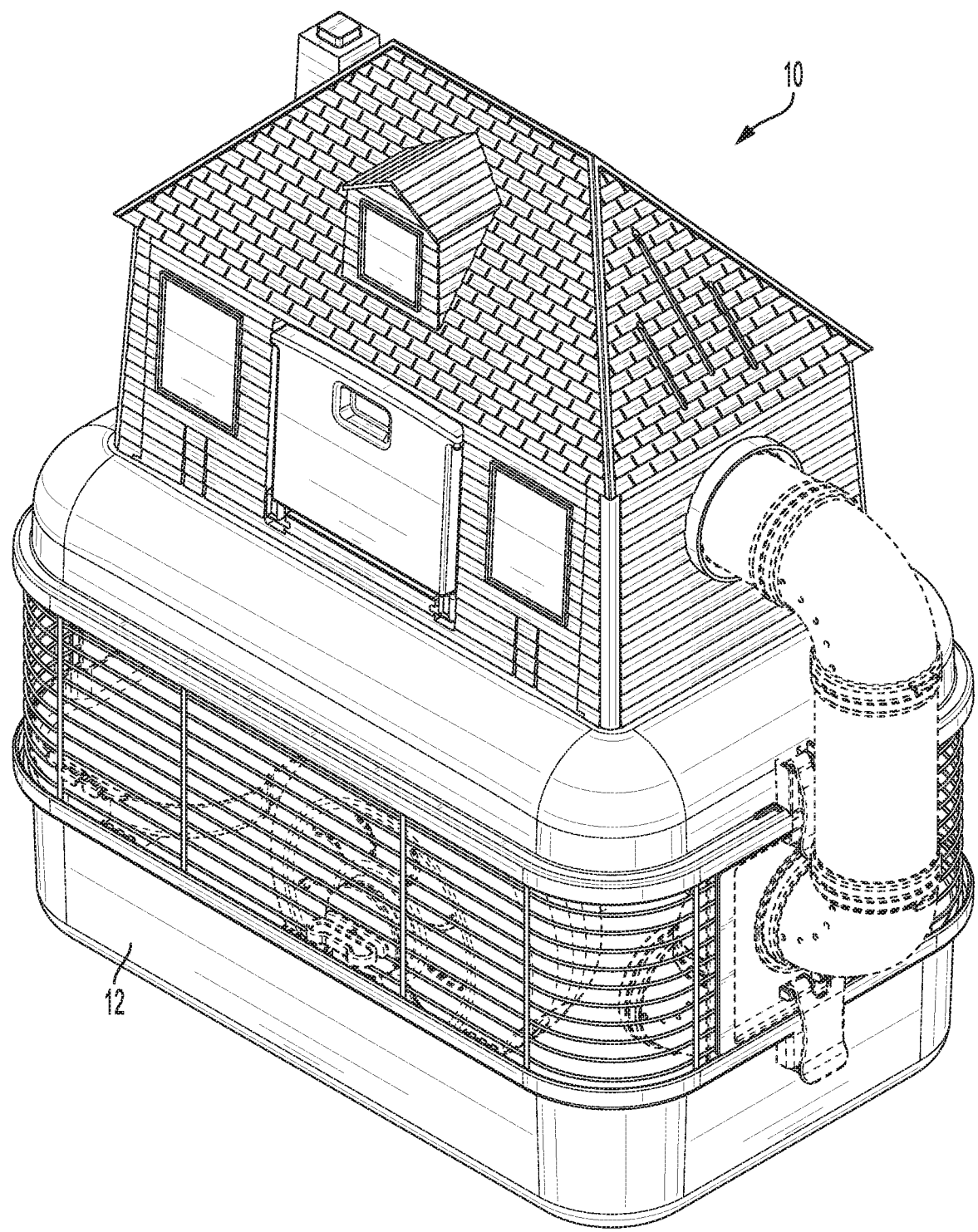
FIG. 1 is a perspective view of the removable hide in accordance with the invention is positioned on top of a lower small animal habitat.

Referring now to FIG. 1 a removable hide 10 is depicted coupled to a lower small animal habitat or cage 12.

Figure 2A:
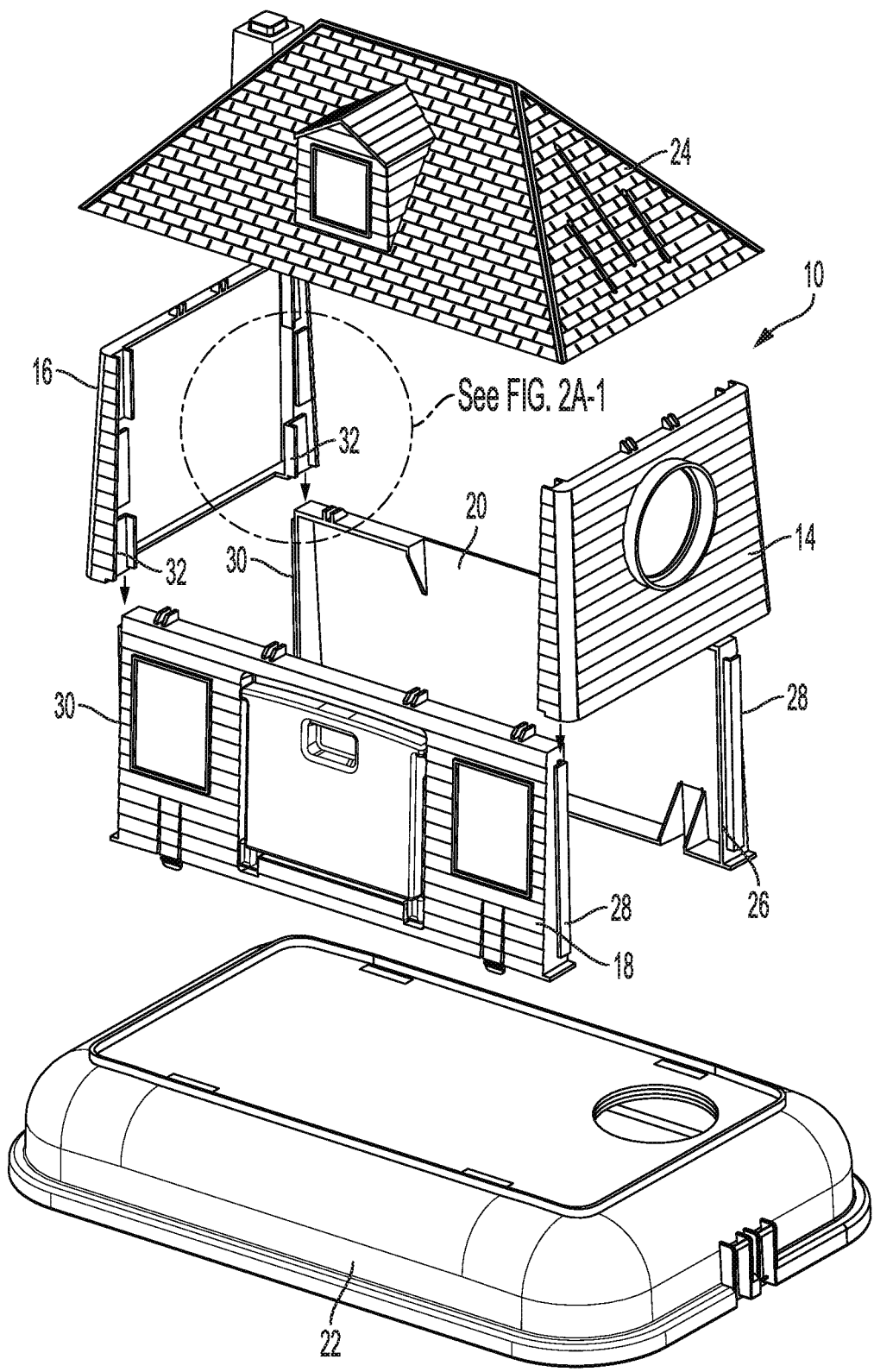
FIG. 2A is one aspect of a small animal habitat depicting a plurality of detachable side panels with detail on the coupling mechanism for the panels.
Figures 1, 2A:
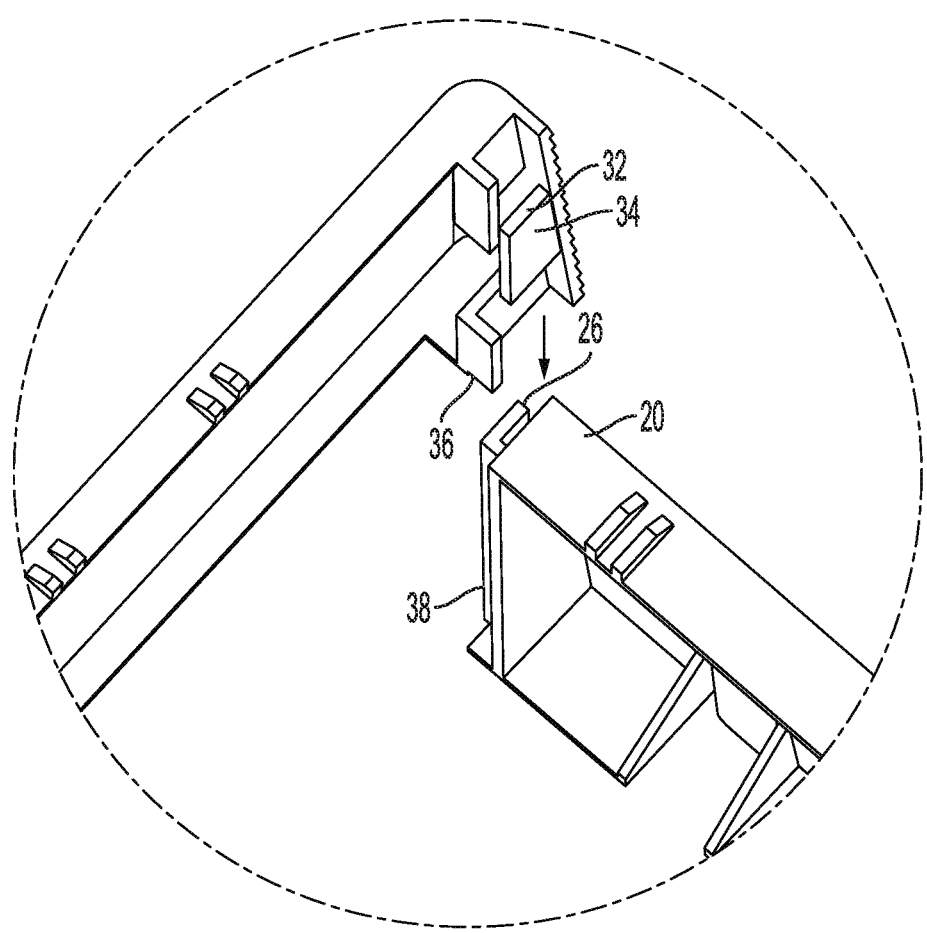
Figure 2B:
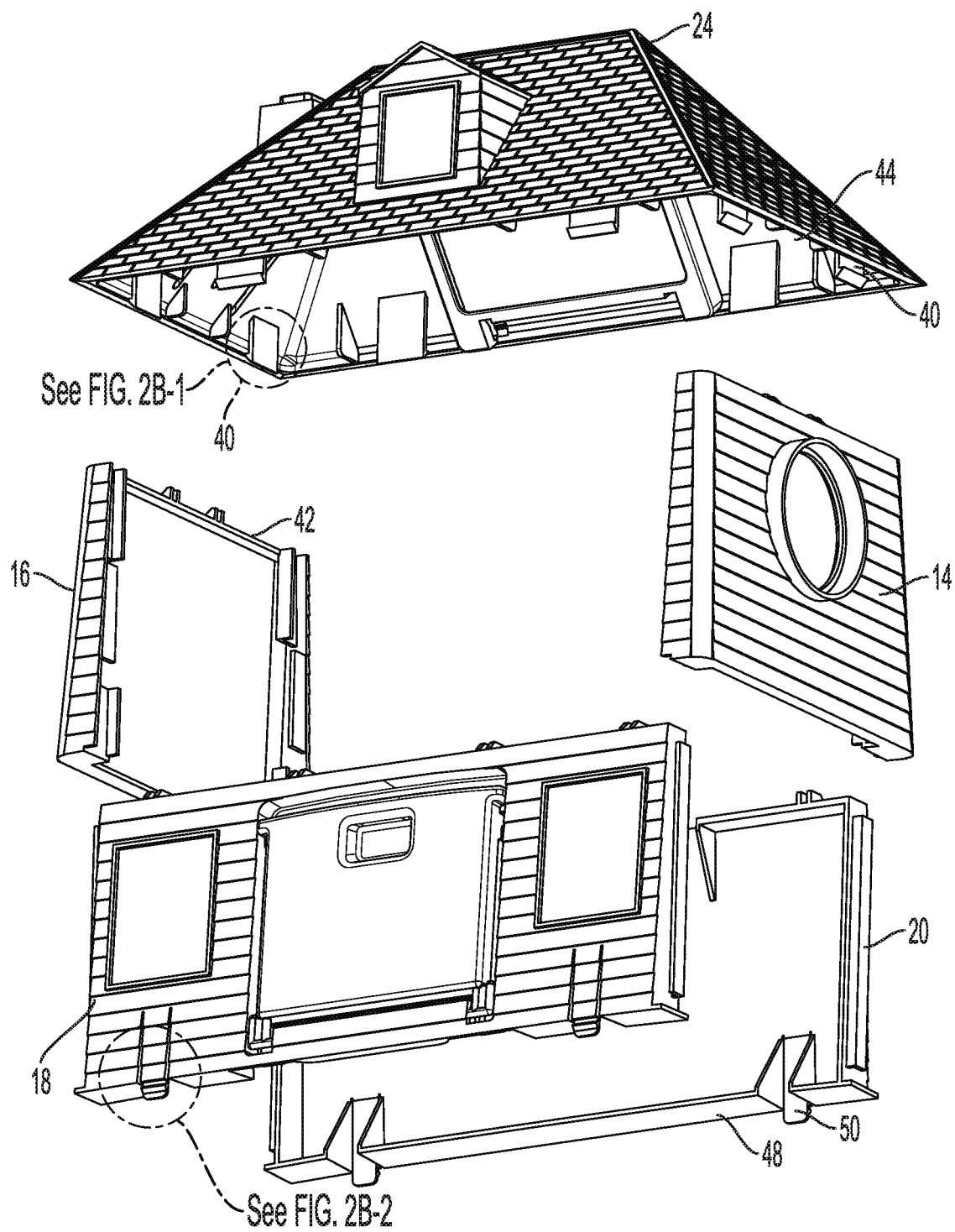
FIG. 2B is another aspect of a small animal habitat depicting a roof panel with breakout detail on the coupling mechanism that detachably couples the roof to the side panels.
Figures 1, 2B:
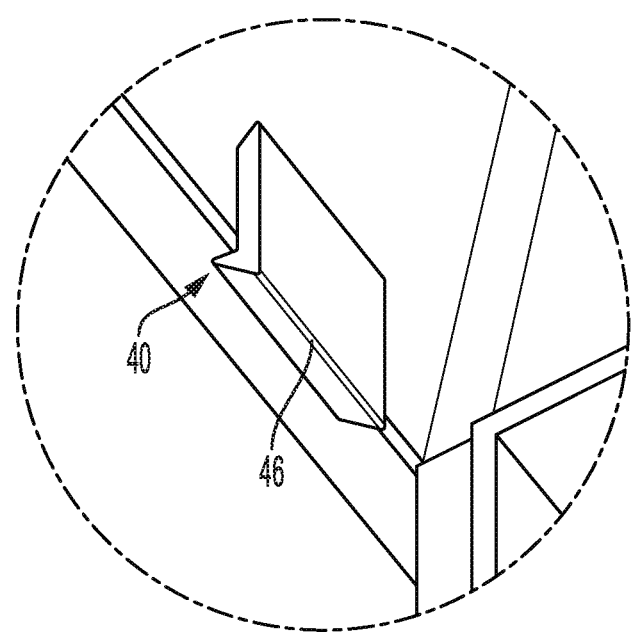
Figures 2, 2B:
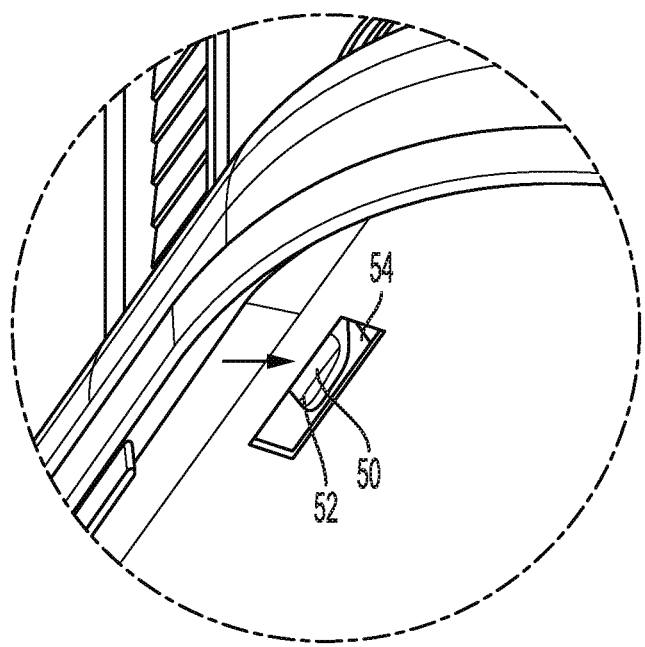

Referring now to FIGS. 2A, 2A-1, 2B, 2B-1, and 2B-2, the removable hide 10 includes a plurality of side panels, namely left and right side panels 14, 16, front panel 18 and back panel 20. Removable hide 10 also includes base 22 and roof 24. Base 22 is also the cover for the lower habitat unit 12. As can best be seen in the breakout detail front and back panels 18, 20 include a channel 26 on first and second edges 28, 30 thereof. Each of right and left side panels 14, 16 include a coupling mechanism 32. Each coupling mechanism 32 includes a vertical tab 34 and a laterally extending tab 36. Vertical tab 34 is slidably received by channel 26 while laterally extending tab 36 abuts a side 38 of channel 26 such that coupling mechanism 32 and channel 26 form an interlocking relationship. As shown in FIG. 2B, the upper edge of each side of the panels includes a lip 42 thereon whose function will be disclosed hereinafter.

As best seen in FIG. 2B, roof 24 includes a plurality of roof tabs 40 positioned on a lower edge of each side of the roof 24. Roof tabs 40 extend downwardly from a lower edge 44 of each side of roof 24. Roof tabs 40 include a radially extending flange 46 that snappingly engages lip 42.

Figure 3A:
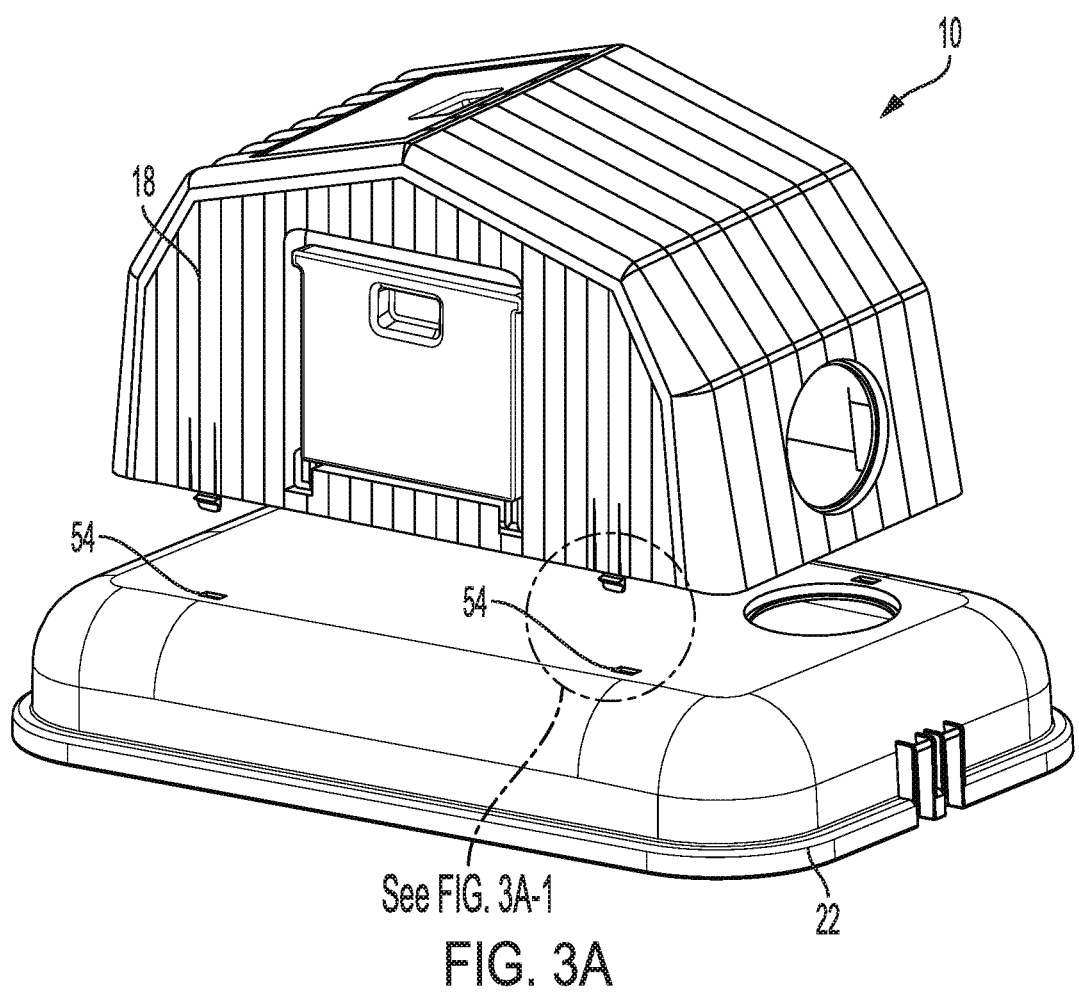
FIG. 3A is another aspect of a small animal habitat depicting breakout detail on the coupling mechanism that couples the assembled hide to the lower small animal habitat.
Figures 1, 3A:
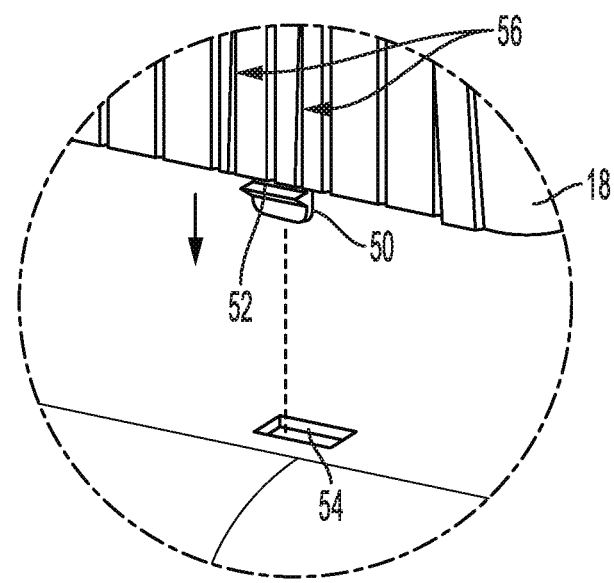
Figure 3B:
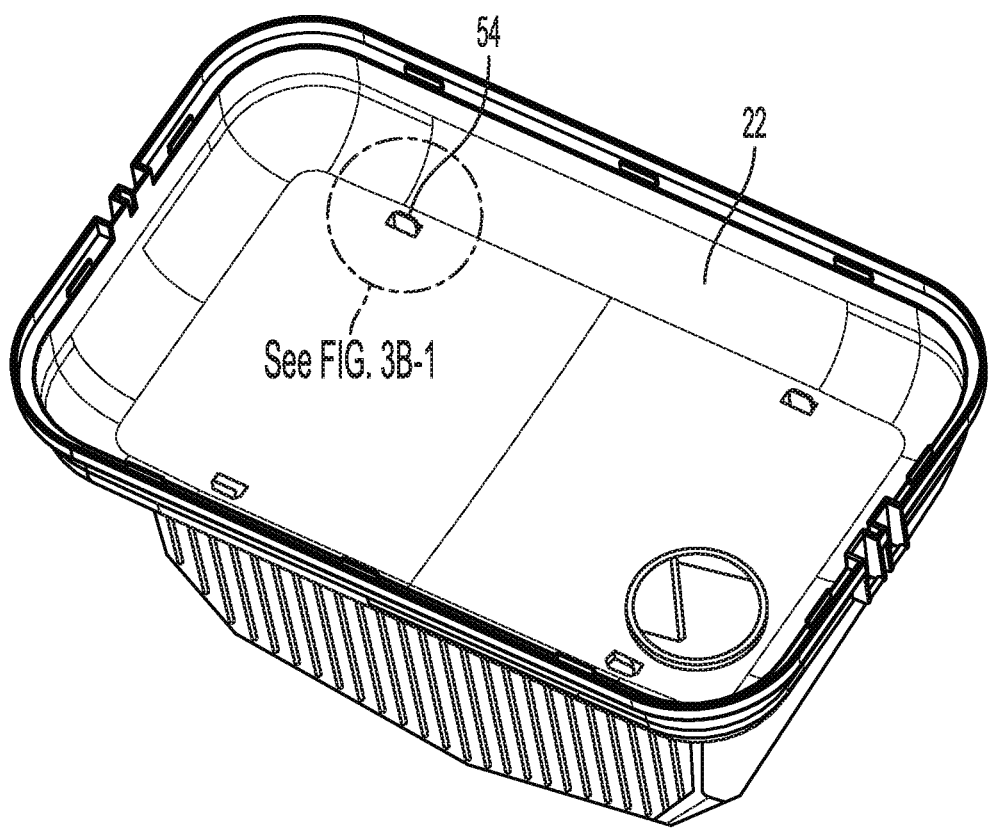
FIG. 3B depicts detail of the coupling mechanism of FIG. 3A.
Figures 1, 3B:
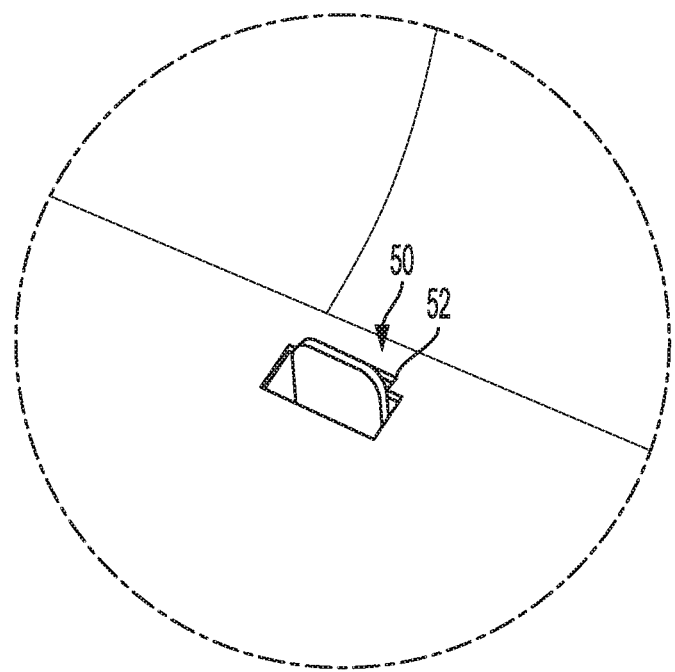

Referring further to FIGS. 3A, 3A-1, 3B, and 3B-1, a coupling mechanism for coupling the hide 10 to the base 22 is depicted. Clips 50 are seen positioned on bottom edge 48 (shown in FIG. 2B) of front and back panels 18, 20 that are similar in design to roof tabs 40. Clips 50 include flange 52 that snappingly couples the removable hide 10 to receiving slots 54 in base 22. As can best be seen in the breakout detail in FIG. 3A-1 front and back panels include a plurality of ribs 56 having an air channel (not shown) therewithin into which the upper end of clips 50 are resiliently positioned. The air channel in ribs 56 allow the clips 50 to flex inwardly. Flange 52 then snaps over the edge of slots 54 when pushed into slots 54.

Figure 4A:
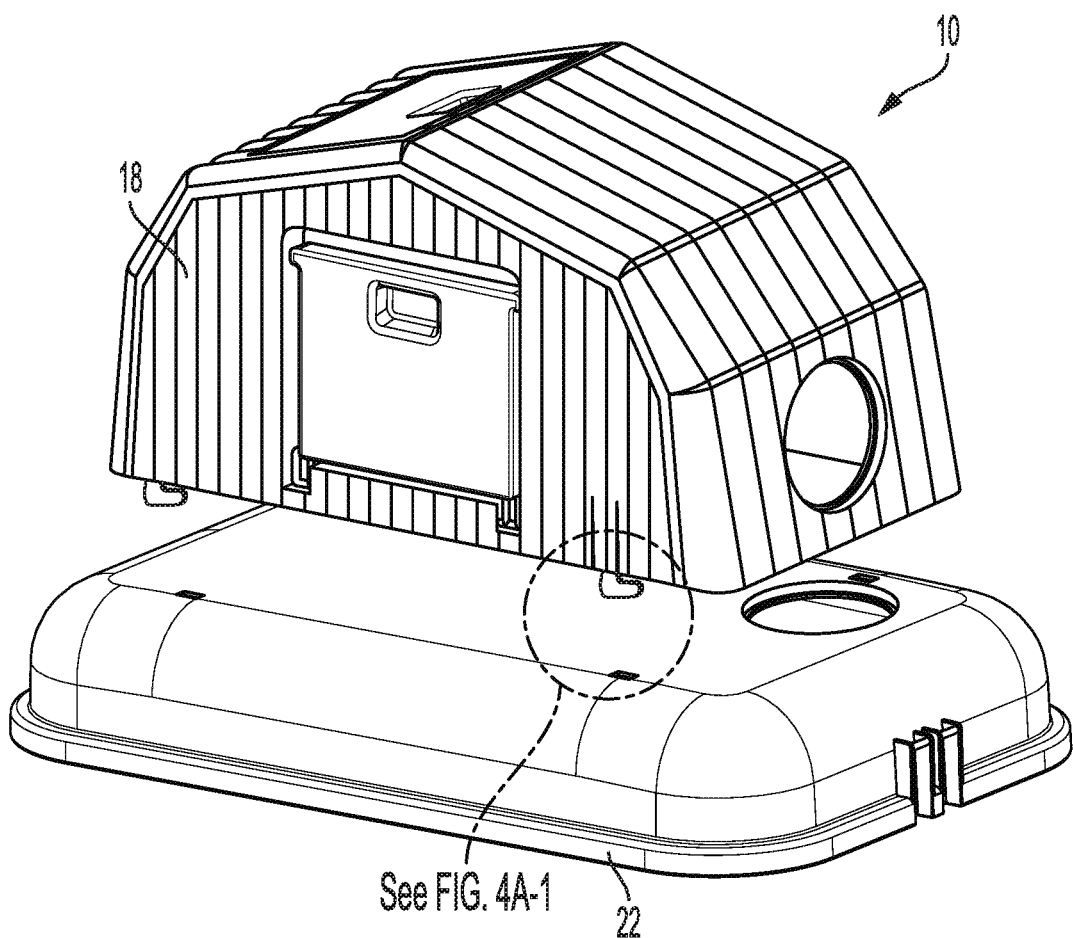
FIG. 4A is another aspect of a small animal habitat coupling mechanism with breakout detail depicting a slide coupling mechanism.
Figures 1, 4A:
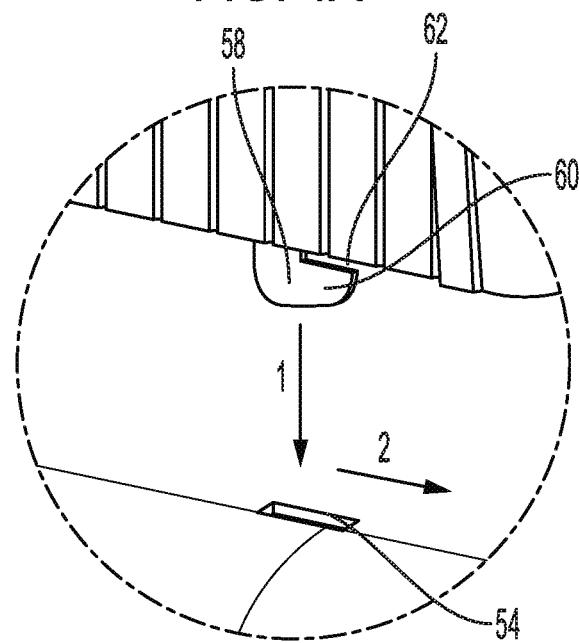
Figure 4B:
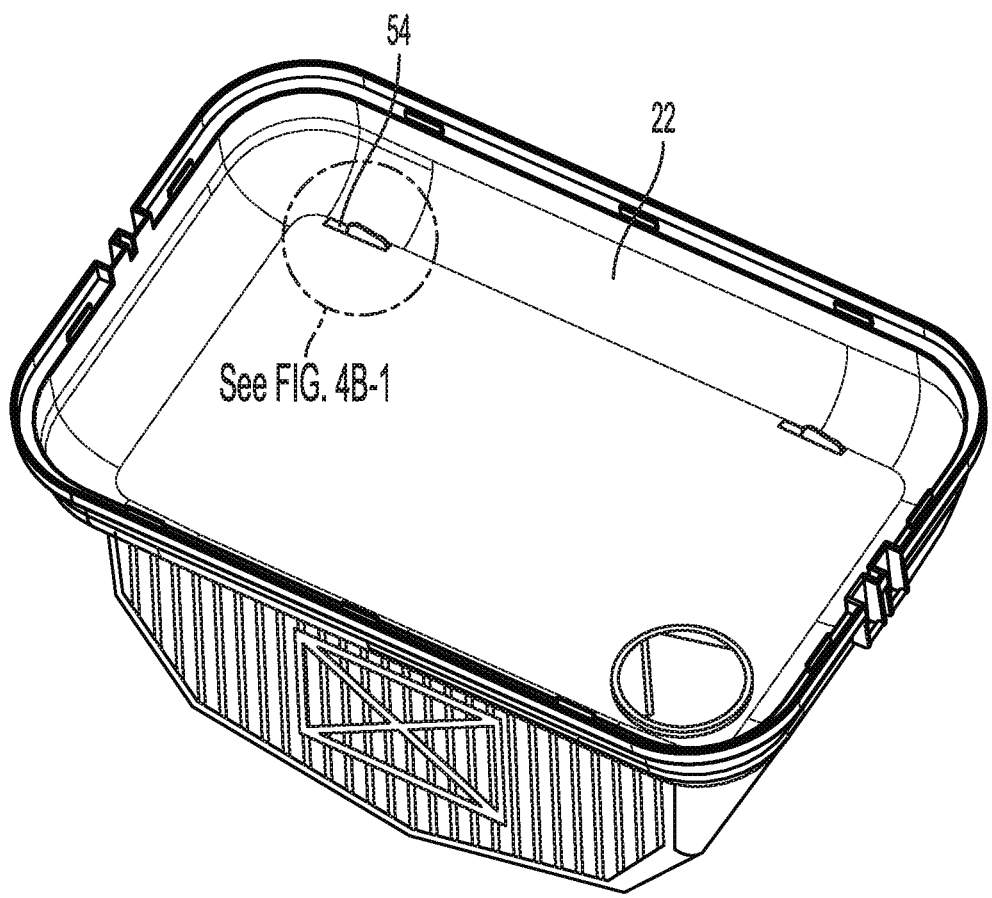
FIG. 4B depicts detail of the coupling mechanism of FIG. 4A.
Figures 1, 4B:
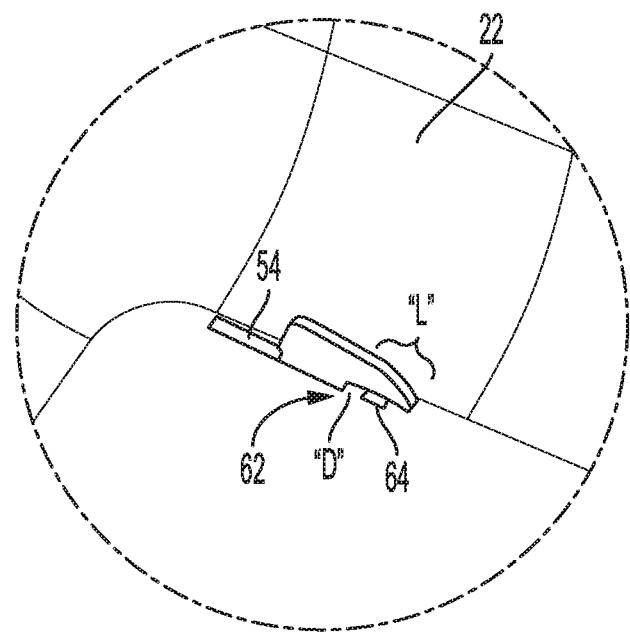

Referring now to FIGS. 4A, 4A-1, 4B, and 4B-1, a different aspect of a coupling mechanism for coupling the hide 10 to the base 22 is shown. L-shaped clips 58 are coupled to and extend downwardly from the bottom edge 48 of front and back panels (shown in FIG. 2B). L-shaped clips 58 include a laterally extending flange 60 that when positioned on the bottom edge 48 of front and back panels includes a space 62 therebetween. The underside of base includes raised portions 64 positioned at a distance "D" outside slots 54. Distance "D" is less than the length "L" of space 62. Hide 10 is positioned over base 22 and L-shaped clips 58 are received by slots 54. The hide 10 is then shifted laterally which causes raised portion 64 to be received within space 62 of L-shaped clips 58 locking the hide 10 to base 22.

Figure 5A:
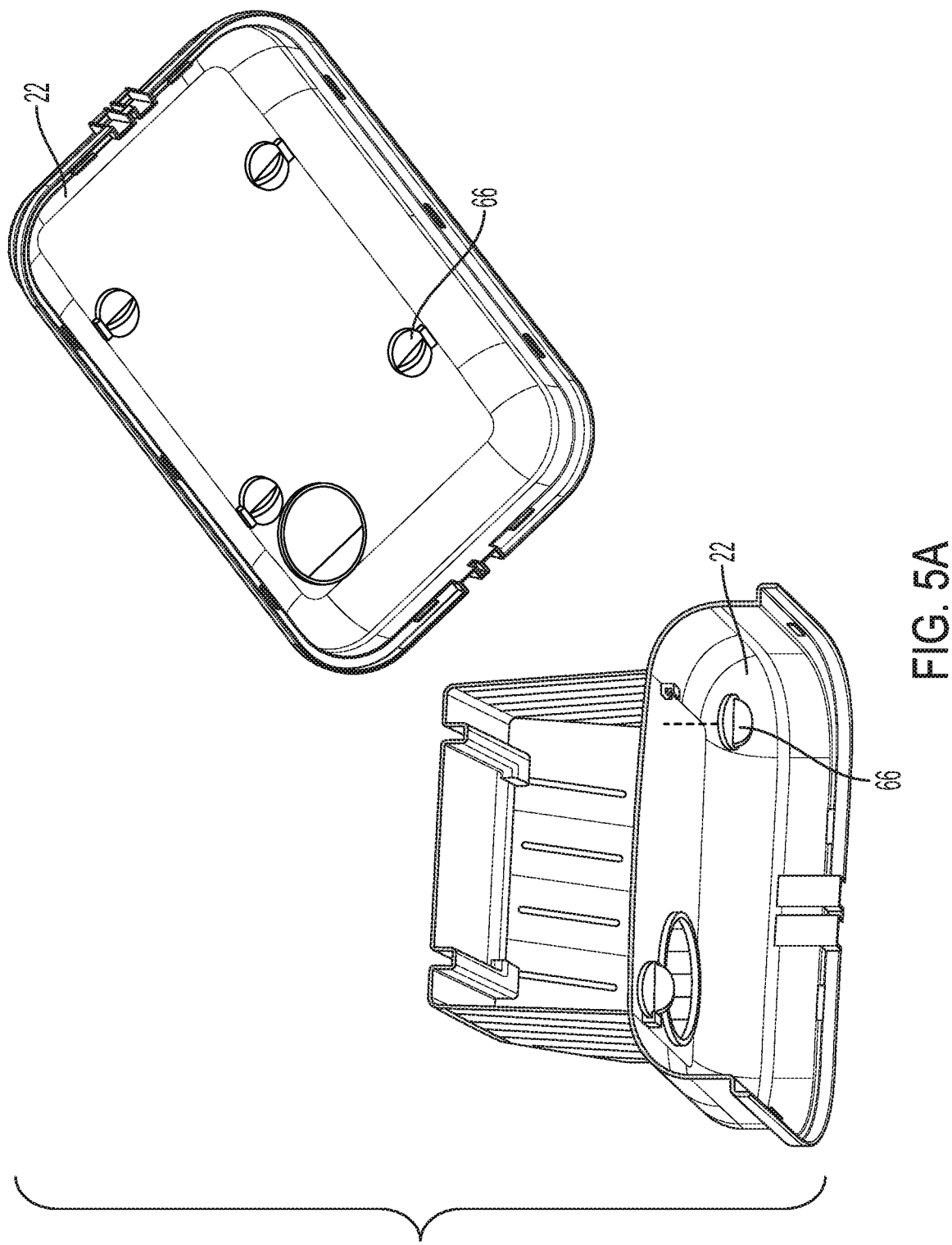
FIG. 5A is another aspect of a small animal habitat coupling mechanism.

Referring now to FIGS. 5A and 5B, a different aspect of a coupling mechanism for coupling the hide 10 (as described above) to the base 22 is depicted. Coupling mechanism includes rotatable disc 66 and U-shaped in cross section clip 68. U-shaped in cross section clips 68 each include a channel 69 having a boss 70 therewithin. U-shaped in cross section clips 68 are coupled to the bottom edge 48 of front and back panels 18, 20 (as shown and described above with respect to FIG. 2B). Disc 66 includes main body 72 having a finger-graspable tab 77 thereon and a recess 74 on an edge 76 thereof. Rotatable disc 66 includes an off-center pin (not shown) at the underside of main body 72 that creates a cam-type movement when disc 66 is rotated to its locked position. Recess 74 engages boss 70 when disc is rotated into the U-shaped in cross section clip 68 and into the locked position thereby seating the width of the disc 66 within channel 69 and coupling hide 10 to base 22.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the disclosure. The terminology used herein was chosen to best explain the principles of the embodiment, the practical application or technical improvement over technologies found in the marketplace, or to enable others of ordinary skill in the art to understand the embodiments disclosed herein.

What is claimed:

1. A hide for a small animal habitat comprising:
   a base;
   a hide configured to be coupled to the base and comprising a first side panel, a second side panel, a front panel, and a back panel;
   a roof configured to be coupled to the hide; and
   a plurality of coupling mechanisms configured to removably couple the first and second side panels to the front and back panels, wherein:
   the front and back panels each include a L-shaped arm defining a channel;
   each of the coupling mechanisms comprises a vertical tab and a laterally extending tab;
   the vertical tab is configured to the be received within the channel; and
   the laterally extending tab is configured to abut a side of the L-shaped arm opposite to the base of the channel so that the laterally extending tab, the vertical tab, and the L-shaped arm interlock to secure the first or second side panel to the front or rear panel.

2. The hide of claim 1 wherein said base includes one or more receiving slots therein.

3. The hide of claim 1 wherein said front and back panels each include the channel on an edge thereof.

4. The hide of claim 1 wherein each of said side panels includes a lip on an upper edge thereof.

5. The hide of claim 4 wherein said roof includes a bottom portion having a lower edge with one or more radially extending tabs.

6. The hide of claim 5 wherein said radially extending tabs include a flange that matingly couples to said lip to detachably couple the roof to the side panels.

7. The hide of claim 6 wherein the plurality of coupling mechanisms comprises a plurality of first coupling mechanisms, and the hide further comprises a second coupling mechanism configured to removably couple the hide to the base, the second coupling mechanism comprising a clip having a radially extending flange.

8. The hide of claim 7 wherein said base includes a plurality of receiving slots therein configured to receive said clip wherein said flange engages a side of said receiving slot to detachably couple the hide to the base.

9. The hide of claim 1 wherein said coupling mechanism comprises one or more L-shaped clips.

10. The hide of claim 9 wherein said base includes a plurality of receiving slots therein having a raised portion positioned a distance from an end of said receiving slot, wherein said receiving slot is configured to slidably receive said L-shaped clip in a first position and lock said hide to said base when the L-Shaped clip is laterally moved to a second position.

11. The hide of claim 1 wherein said side panels each include a U-shaped in cross section defining a channel therewithin.

12. The hide of claim 11 wherein said channel includes a boss.

13. The hide of claim 12 wherein said base includes a plurality of rotatable discs.

14. The hide of claim 13 wherein said rotatable disc includes a recess on an edge thereof.

15. The hide of claim 14 wherein said recess is configured to lockingly engage said U-shaped in cross section channel when said disc is rotated from a first position to a second position.

16. The hide of claim 14 wherein said recess is configured to lockingly engage said boss when said disc is rotated from a first position to a second position.

17. The hide of claim 15 wherein said second position couples said hide to said base.

* * * * *